United States Patent

Van Stephoudt

[11] Patent Number: 5,917,112
[45] Date of Patent: Jun. 29, 1999

[54] MINERAL VEGETATION SUBSTRATE PROCESS FOR THE (RE)CULTIVATION OF SOILS AND USE

[76] Inventor: Franz Van Stephoudt, Küstersweg 25, D-47652 Weeze, Germany

[21] Appl. No.: 08/973,034

[22] PCT Filed: Apr. 26, 1996

[86] PCT No.: PCT/DE96/00775

§ 371 Date: Nov. 26, 1997

§ 102(e) Date: Nov. 26, 1997

[87] PCT Pub. No.: WO96/38512

PCT Pub. Date: Dec. 5, 1996

[30] Foreign Application Priority Data

May 30, 1995 [DE] Germany ............................ 19520823

[51] Int. Cl.⁶ .............................. C05D 9/00; A01N 25/00; C09K 17/00
[52] U.S. Cl. ............................... 71/31; 71/64.13; 71/903; 47/902; 106/900; 405/263
[58] Field of Search .................. 71/903, 64.13, 71/31; 47/DIG. 10, 902; 106/900; 405/263

[56] References Cited

U.S. PATENT DOCUMENTS

| | | | |
|---|---|---|---|
| 5,265,372 | 11/1993 | Ishizuka et al. | 47/9 |
| 5,328,498 | 7/1994 | Lang et al. | 71/64.07 |
| 5,603,744 | 2/1997 | Kurner | 71/9 |

FOREIGN PATENT DOCUMENTS

| | | |
|---|---|---|
| 183639 | 4/1986 | European Pat. Off. |
| 0 183 639 | 6/1986 | European Pat. Off. |
| 0 279 056 | 8/1988 | European Pat. Off. |
| 0 427 704 | 5/1991 | European Pat. Off. |
| 34 39 224 | 4/1986 | Germany. |
| 42 40 051 | 6/1994 | Germany. |
| 43 11 576 | 10/1994 | Germany. |
| 43 23 633 | 1/1995 | Germany. |

OTHER PUBLICATIONS

Fox, et al., Comparison of regeneration following burning, clearing or mineral sand mining at Tomago, Austrialian Journal of Ecology, pp. 184–199, Jun. 1996.

Primary Examiner—Wayne Langel
Assistant Examiner—Melanie Wong
Attorney, Agent, or Firm—Collard & Roe, P.C.

[57] ABSTRACT

The invention relates to a mineral vegetation substrate for agricultural or forestry use. The problem with prior art soil substrates based on recycled materials is that the usable field capacity is often insufficient or sufficient only with special additives. According to the invention, therefore, a mineral vegetation substrate consists of 45 to 65 wt. % geogenous sand and/or sandy soil with a grain size $d_{50}$ of 0.20 to 0.35 mm, 4 to 8 wt. % coarse-grained crushed clay tiles with a grain size $d_{50}$ of 25 to 35 mm, 8 to 18 wt. % fine-grained crushed clay tiles with a grain size $d_{50}$ of 0.7 to 1.5 mm, 4 to 8 wt. % coarse-grained crushed concrete with a grain size $d_{50}$ of 15 to 25 mm, 8 to 18 wt. % fine-grained crushed concrete with a grain size $d_{50}$ of 1.5 to 3.5 mm, 8 to 13 wt. % binders like geogenous clay with a grain size $d_{50}$ of 0.08 to 0.15 mm or clay in a homogenous mixture. The substrate is particularly suitable for soils poor in humus and for areas affected by forest fires and open-cast mining.

9 Claims, No Drawings

MINERAL VEGETATION SUBSTRATE PROCESS FOR THE (RE)CULTIVATION OF SOILS AND USE

The invention concerns a mineral vegetation substrate for use in agriculture and forestry and a method of cultivating or recultivating soils and use of the substrate.

A number of soil substrates of waste or recycling materials are known. For example, German Patent DE 4,323,633 discloses a mixture for covering waste dumps, subsidences, etc. as a recultivation substrate of organic and mineral components with approximately equal amounts of the two components.

German Patent DE 3,439,224 describes a vegetation layer of a mineral mixture of sands, humus, rocks, etc. to which an aggregate such as dump slag is added, where salts, especially lime, are to be released under the influence of moisture.

German Patent DE 4,240,051 uses crushed pieces of roof tile in different grain sizes together with compost for sodding roof surfaces.

Finally, German Patent DE 4,311,576 proposes a substrate for sodding roofs, consisting of crushed, open-pore inorganic recycling and/or waste materials as the structural building blocks and composted organic recycling and/or waste materials as humus substances.

The object of the invention is to make available a mineral vegetation substrate which has a composition that ensures reliable cultivation of crop plants or trees in agriculture or forestry, in particular on soil with a low humus content, and has an adequate usable field capacity.

The mineral vegetation substrate according to this invention consists of:

- 45 to 65 wt % geogenous sand and/or sandy topsoil with a grain size $d_{50}$ of 0.20–0.35 mm,
- 4 to 8 wt % coarse-grained crushed clay tile with a grain size $d_{50}$ of 25–35 mm,
- 8 to 18 wt % fine-grained crushed clay tile with a grain size $d_{50}$ of 0.7–1.5 mm,
- 4 to 8 wt % coarse-grained crushed concrete with a grain size $d_{50}$ of 15 to 25 mm,
- 8 to 18 wt % fine-grained crushed concrete with a grain size $d_{50}$ of 1.5–3.5 mm,
- 8 to 13 wt % binders such as geogenous loam with a grain size $d_{50}$ of 0.08–0.15 mm or clay in a homogeneous mixture.

The substrate composition according to this invention, which is sufficient without the addition of humus or compost products, has a highly utilizable field capacity or storage moisture content. The field capacity is defined as the maximum quantity of water that can be retained by a soil against the force of gravity in undisturbed bedding. It is generally stated as the water content two to three days after complete saturation with water or the water content at a defined water tension of pF >1.8 and is given in $L/m^3$ or mm/dm. For the "utilizable field capacity" parameter for practical use, the so-called dead water has been subtracted, so the water content is given at a water tension between pF=1.8 and 4.2.

With loose bedding of the vegetation substrate according to this invention, utilizable field capacity values of more than 16 mm/dm are achieved, i.e., average effective rooting depths of more than 84 mm.

Especially advantageous mineral vegetation substrates according to this invention consist of:

- 50 to 65 wt % geogenous sand and/or sandy topsoil with a grain size $d_{50}$ of 0.25–0.30 mm,
- 5 to 7 wt % coarse-grained crushed clay tile with a grain size $d_{50}$ of 25–30 mm,
- 10 to 18 wt % fine-grained crushed clay tile with a grain size $d_{50}$ of 0.9–1.1 mm,
- 4 to 6 wt % coarse-grained crushed concrete with a grain size $d_{50}$ of 15 to 25 mm,
- 8 to 16 wt % fine-grained crushed concrete with a grain size $d_{50}$ of 1.5–3.0 mm,
- 8 to 13 wt % binders such as geogenous loam with a grain size $d_{50}$ of 0.08–0.15 mm or clay in a homogeneous mixture.

The stated grain size $d_{50}$ means that at least 50% of the specific component has the stated grain size, and the remainder is randomly distributed above and below this grain size.

Nutrients and soil conditioners may be added to the vegetation substrate according to this invention; however, it can be used agriculturally or especially in forestry in the composition given above. It is especially suitable for use on sandy sites that have a low nutrient content and are remote from ground water, especially after forest fires, for recultivation with critical species of wood. In addition, it can be used effectively for silviculture for cultivation of deciduous trees on poor or highly exposed sites. It can also be used to particular advantage for sodding and reforestation of landfill areas in brown coal strip mining and for soil conditioning of tertiary sandy areas and for planting of contaminated soils.

The invention also concerns a method of cultivating or recultivating soils that have a low humus content or have been contaminated, and it is characterized in that a mineral vegetation substrate consisting of

- 45 to 65 wt % geogenous sand and/or sandy topsoil with a grain size $d_{50}$ of 0.20–0.35 mm,
- 4 to 8 wt % coarse-grained crushed clay tile with a grain size $d_{50}$ of 25–35 mm,
- 8 to 18 wt % fine-grained crushed clay tile with a grain size $d_{50}$ of 0.7–1.5 mm,
- 4 to 8 wt % coarse-grained crushed concrete with a grain size $d_{50}$ of 15 to 25 mm,
- 8 to 18 wt % fine-grained crushed concrete with a grain size $d_{50}$ of 1.5–3.5 mm,
- 8 to 13 wt % binders such as geogenous loam with a grain size $d_{50}$ of 0.08–0.15 mm or clay in a homogeneous mixture is applied in a layer 20 to 100 cm thick to the existing soil, and the vegetation is planted on this substrate.

The layer thickness and the precise composition of the mineral mixture used to cultivate or recultivate soils depend on the average rainfall, the type of plants to be used, selected from the group consisting of grass, trees and bushes, and on the existing soil type. Depending on the nature of these pre-existing factors, those skilled in the art can select the layer thickness and substrate composition suitable for their purposes to arrive at the desired result without any inventive contribution. Thus, for example, with a very sandy soil with a low soil characteristic value and rapid runoff of rainfall, a layer in the range of 50 to 70 cm of mineral vegetation substrate with a higher binder content (substances that bind the mixture and thus retain water) and fine-grained crushed clay tile is to be provided to store rainwater better and to ensure good rooting of deciduous trees, for example. The capillary water bedding effect of the fine-grained crushed clay tile is also utilized here.

Greater layer thicknesses of 70 to 100 cm and also larger amounts of binders and fine-grained crushed clay tile are to be provided for contaminated soils to prevent rainwater from entering the contaminated soils as much as possible and thus keep the groundwater free of contaminants. Reforestation with coniferous woods or mixed woods is expedient in such a case.

With loamy soils, however, a smaller amount of binders and fine-grained crushed clay tile and/or concrete in the mineral vegetation substrate is expedient to ensure better water runoff through the substrate, where the layer thickness also depends on the desired planting (e.g., about 25 to 30 cm for grass). Even with a high average rainfall, a similar layer structure is still expedient for better water runoff.

These suggestions are a sufficient starting point for those skilled in the art to achieve the desired goal by varying the above-mentioned features.

It has surprisingly been found that a vegetation substrate with a composition according to this invention permits good rooting with sufficient retention capacity for surface water, especially in the stated use area.

With a bedding thickness of 800 mm of the substrate with loose bedding, more than 95% beech seedling emergence has been achieved in outdoor experiments without additional watering within a vegetation period with average rainfall.

This invention is explained in greater detail below with examples.

EXAMPLE 1

The individual components of the vegetation substrate were crushed and screened according to grain size after delivery. The individual components were mixed in the previously determined quantity ratios in a mixing installation. The mixture consisted of an essentially homogeneous blend of 25 wt % geogenous sand and 25 wt % topsoil with a grain size $d_{50}$ of 0.28 mm,

- 5.5 wt % coarse-grained crushed clay tile with a grain size $d_{50}$ of 30 mm,
- 14 wt % fine-grained crushed clay tile with a grain size $d_{50}$ of 1.1 mm,
- 4.5 wt % coarse-grained crushed concrete with a grain size $d_{50}$ of 20 mm,
- 16 wt % fine-grained crushed concrete with a grain size $d_{50}$ of 2.5 mm,
- 10 wt % geogenous loam with a grain size $d_{50}$ of approximately 0.12 mm.

The mixture was applied as a vegetation substrate in a layer thickness of 80 cm to a site remote from groundwater (lean sandy site, corresponding approximately to a soil characteristic value of 15 in agriculture). The area was planted with linden, red beech and red oak saplings in a 2×2 m formation.

After two vegetation periods, 96% of the saplings had taken root, although the soil did not receive any additional nutrients or any additional watering after planting the saplings following a lengthy period of rainfall.

An equally large area planted directly next to that on the pre-existing natural soil substrate for comparison purposes yielded the following results over the same period of time: loss of linden and red birch approximately 60% loss of red oak approximately 40%.

EXAMPLE 2

A mixture according to Example 1 was applied in a layer 40 cm thick to a forest fire area of approximately 10,000 m². Two-year s-pines were planted at distances of 130×30 cm.

After two vegetation periods, 92% of the saplings had taken root and had developed new sprouts.

I claims:

1. A mineral vegetation substrate, comprising the following components:

45 to 65 wt % of a substance selected from the group consisting of geogenous sands, sandy topsoil and mixtures thereof with a grain size $d_{50}$ of 0.20–0.35 mm, 4 to 8 wt % coarse-grained crushed clay tile with a grain size $d_{50}$ of 25–35 mm, 8 to 18 wt % fine-grained crushed clay tile with a grain size $d_{50}$ of 0.7–1.5 mm, 4 to 8 wt % coarse-grained crushed concrete with a grain size $d_{50}$ of 15 to 25 mm, 8 to 18 wt % fine-grained crushed concrete with a grain size $d_{50}$ 0f 1.5–3.5 mm, 8 to 13 wt % binder comprising geogenous loam with a grain size $d_{50}$ of 0.08–0.15 mm or clay in a homogeneous mixture.

2. A substrate according to claim 1, comprising the following components:

50 to 65 wt % of a substance selected from the group consisting of geogenous sands, sandy topsoil and mixtures thereof with a grain size $d_{50}$ of 0.25–0.30 mm, 5 to 7 wt % coarse-grained crushed clay tile with a grain size $d_{50}$ of 25–30 mm, 10 to 18 wt % fine-grained crushed clay tile with a grain size $d_{50}$ of 0.9–1.1 mm, 4 to 6 wt % coarse-grained crushed concrete with a grain size $d_{50}$ to 25 mm, 8 to 16 wt % fine-grained crushed concrete with a grain size $d_{50}$ of 1.5–3.0 mm, 8 to 13 wt % geogenous loam with a grain size $d_{50}$ of 0.08–0.15 mm in a homogeneous mixture.

3. A substrate according to claim 1, comprising a layer with a thickness of 20 to 100 cm with an average field capacity of more than 16 mm/dm on an existing soil.

4. A substrate according to claim 3, comprising a layer with a thickness of 40 to 80 cm on the existing soil.

5. A substrate according to claim 3, wherein the existing soil is a forest fire area.

6. A substrate according to claim 3, wherein the existing soil is contaminated soil.

7. A substrate according to claim 3, wherein the existing soil is selected from the group consisting of soil from a forest fire, soil from strip mining and landfill from strip mining.

8. In a method for providing a mineral vegetation substrate for planting, the improvement which comprises utilizing the mineral vegetation substrate according to claim 1 for planting on contaminated soil or soil from a forest fire.

9. A method of cultivating or recultivating contaminated soil comprising applying a mineral vegetation substrate consisting of 45 to 65 wt % of a substance selected from the group consisting of geogenous sands, sandy topsoil and mixtures thereof with a grain size $d_{50}$ of 0.20–0.35 mm, 4 to 8 wt % coarse-grained crushed clay tile with a grain size $d_{50}$ of 25–35 mm, 8 to 18 wt % fine-grained crushed clay tile with a grain size $d_{50}$ of 0.7–1.5 mm, 4 to 8 wt % coarse-grained crushed concrete with a grain size $d_{50}$ of 15 to 25 mm, 8 to 18 wt % fine-grained crushed concrete with a grain size $d_{50}$ of 1.5–3.5 mm, 8 to 13 wt % binder comprising geogenous loam with a grain size $d_{50}$ of 0.08–0.15 mm or clay in a homogeneous mixture in a layer 20 to 100 cm thick to an existing soil and doing planting on this substrate.

* * * * *